United States Patent Office 2,951,662
Patented Sept. 6, 1960

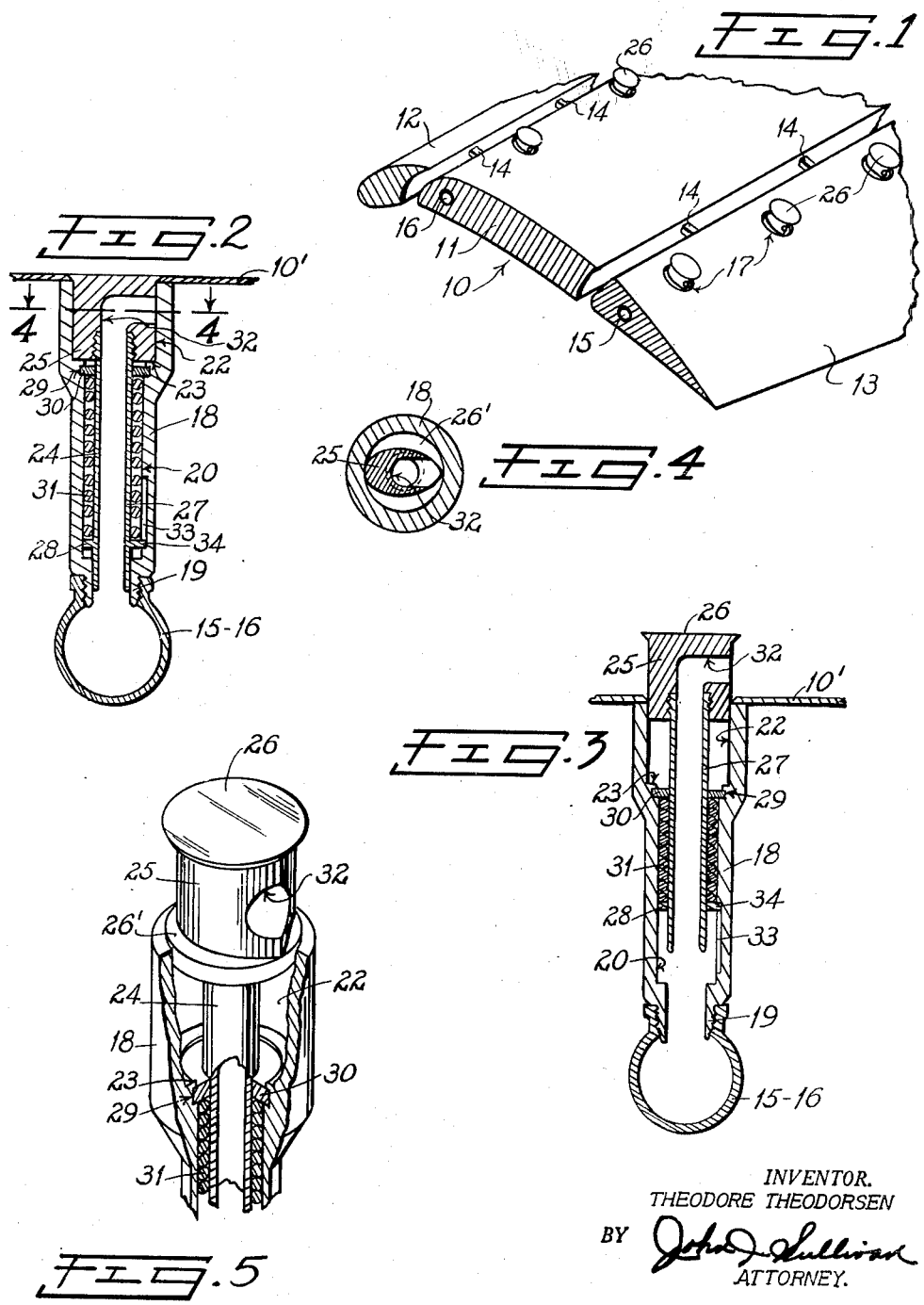

2,951,662

BOUNDARY LAYER CONTROL MEANS FOR OBTAINING HIGH LIFT FOR AIRCRAFT

Theodore Theodorsen, Huntington, N.Y., assignor to Republic Aviation Corporation, near Farmingdale, N.Y., a corporation of Delaware Filed Apr. 21, 1958, Ser. No. 729,864

17 Claims. (Cl. 244—42)

This invention relates to control means for boundary layer air of airplanes and more particularly to means for maintaining attached airflow along the upper surface of a high-speed airplane under conditions of high lift such as, for example, at take-off and landing.

Among other things, the present invention contemplates means operable upon a change in camber or angle of the horizontal surfaces of an airplane during flight to control the flow of boundary layer air thereover whereby such air adheres to said surfaces at the adjusted angle or camber. During normal camber or high-speed position of the horizontal surfaces, this control means is designed to be disposed in an inoperative position where it has no affect on boundary layer air or general operation of the airplane.

Moreover, when operative, the instant control means is so organized and arranged that the layers of air adjacent and above the horizontal surface of a wing are supplied with excess energy as they pass over such surface to produce lift. In addition, this control means lends itself to adjustment whereby it effects maximum lift of the associated surface with a minimum of expended energy due to the fact that excess momentum is supplied in effect to the layers over and some distance above the actual boundary layer. Thus, the velocity or velocity gradient of the air near the surface does not reach excessive values and the skin friction or surface drag remains low.

The above as well as other objects and advantages of the present invention can best be understood and appreciated by a more specific consideration of some of the problems attending take-off and landing of high-speed aircraft.

At present-day high speeds, supersonic and hypersonic flight per se of the airplane depends entirely on the jet thrust of its engine. Lift characteristics of the airplane's design is important only in connection with take-off and landing or during flight at high altitude, i.e. 60,000 feet and above. Since a design having good inherent lift characteristics is incompatible with high-speed flight design, compromises have been made. However, speed having been given greater emphasis in recent years, lift characteristics of the ultimate design have suffered. Thus, landing and take-off speeds of high-speed jet airplanes, whether manned or unmanned, have increased, resulting in longer runways, the need for more highly trained pilots or operators and supplemental equipment to facilitate the take-off and/or landing.

Efforts have been made with some success to incorporate design features which lend themselves toward improved lift characteristics of high-speed airplanes for landing and take-off. One of the more successful proposals has involved a modification of the horizontal surfaces of the airplane to the end that its profile may be effectively changed from a high-speed flight configuration to a high-lift configuration. It is to this particular concept and the concurrent problems which arise to which the present invention is directed.

For example, one way employed to change the effective profile of a horizontal surface, such as a wing, is to manufacture it in three spanwise sections, a center, fixed section with a hinged leading edge section and a hinged trailing edge section connected thereto. During high-speed flight operation, these sections are disposed approximately in in-line position whereby the transverse center-line thereof may be substantially parallel to the line of flight. At take-off and landing, however, the hinged sections are deflected relative to the fixed section to establish a transverse configuration simulating a cambered wing.

It has been learned that for maximum lift, a large and substantially symmetrical camber is desirable. Therefore, the hinged leading and trailing sections have in view attaining such camber. The degree of angular adjustment of these leading and trailing sections, however, has been limited due to a separation of the aerodynamic flow or boundary layer air from the upper surface thereof.

This has been explained by the fact that boundary layer air in passing over a surface loses its kinetic energy and at the angle or corner separates from the surface since it no longer has the energy necessary to adhere to the surface. Thus, any lift to be obtained by the air flow passing over the surface is lost. If maximum lift is to be obtained, the boundary layer air must leave the upper surface of the wing at the trailing edge thereof.

According to the teachings of this invention, it is proposed to inject additional air or gas under pressure into the layer or layers of air over and above the upper surface. The dissipated kinetic energy is thereby replenished by new energy whereby the air flow over the surface is stabilized and the boundary layer air is incidentally or indirectly forced to adhere to the surface throughout the area thereof.

To the above ends, this invention contemplates retractable jet nozzles disposed spanwise along the wing at predetermined intervals. Conduit means mounted within the airplane wing connects each of these nozzles to a source of air or gas pressure. During take-off and landing when the hinged, leading and trailing edge sections are deflected, these nozzles are each disposed above the wing surface adjacent the hinge points and directed in a general aft direction. Fluid, i.e. air or gas under pressure from the source, is thereby injected into the air layer passing over the wing surface and separation is prevented. Hence, the boundary layer air is conveyed over the surface of the wing and ejected at and along the trailing edge thereof.

During high-speed operation, i.e. normal flight of the airplane, these nozzles are disposed internally of the wing. Each nozzle is so formed that when retracted, it merges or terminates flush with the surface of the wing and thereby forms an uninterrupted and smooth aerodynamic continuation thereof. In such position, the high-speed configuration or profile of the wing is unaffected by the present means.

With the above and other objects in view as will be apparent, this invention consists in the construction, combination and arrangement of parts all as hereinafter more fully described, claimed and illustrated in the accompanying drawings, wherein:

Fig. 1 is a fragment in perspective view of a horizontal surface or wing of a high-speed airplane according to the present invention to show the mounting of the several nozzle devices located spanwise of the wing and disposed in the operative position;

Fig. 2 is a longitudinal section through one of the nozzle devices and transversely through the connected conduit means to show the nozzle in the retracted or inoperative position, i.e. internally of the wing surface or skin of the airplane;

Fig. 3 is a similar view showing the nozzle extended or in its operative position;

Fig. 4 is a section taken along line 4—4 of Fig. 2; and

Fig. 5 is a view like Fig. 1 showing a single nozzle device at enlarged scale for a clearer view of the details thereof including the streamline or airfoil shape of the portion thereof which projects into the airstream.

More specifically, 10 designates a fragment of an airfoil or wing. This wing is formed by three substantially coextensive spanwise sections, viz. a fixed center section 11, a leading edge section 12, and a trailing edge section 13. The leading and trailing edge sections 12 and 13 are each pivotally connected to the center section 11 by one or more hinges 14 connected thereto in any suitable manner.

A conduit or pipe 15 is mounted internally of the wing 10 to be disposed spanwise thereof adjacent the associated edges of the center section 11 and trailing edge section 13. While the conduit 15 is illustrated as being mounted within the trailing edge section 13, it may in given applications be contained within the center section 11. A similar conduit 16 is mounted within the wing 10 adjacent the associated edges of the center section 11 and the leading edge section 12. These conduits 15 and 16 are substantially identical one to the other both in construction, operation and function, but are treated separately for reasons to become more apparent.

The upper surface of the airfoil 10 is pierced by a plurality of spaced, individual openings 17 disposed in the plane of and at right angles to the conduits 15 and 16. A casing 18 disposed in alignment with each opening 17 underlies the skin 10' of the wing 10 to which it is secured in any suitable manner. At its opposite end, each casing terminates in a threaded neck 19 for cooperation with a threaded opening provided in the associated wall of the conduit 15. Thus, each casing may be threadably secured in the conduit 15 and thereafter immovably connected, at its other end, to the skin 10' of the wing 10.

Each casing 18 is hollow or tubular to define a passage 20 opening at one end internally of the conduit 15 and, at its other end, concentrically disposed relative to the associated opening 17 to open therethrough externally of the aircraft skin 10'. The internal wall of each casing 18 defining the passage 20 is formed at its outer end with an enlarged diameter 22 whereby a shoulder 23 is created at the base thereof. A reciprocating piston 24 is mounted within the passage 20 having a head 25 the medial portion of which is streamline or airfoil shape in section. The opposed ends of the piston head 25 are formed or otherwise provided with laterally projecting edge surfaces corresponding to the inner surface of the casing end 22 and the edge of the skin 10' defining the opening 17.

More specifically, the outer end of the piston head 25 carries a disc or plate 26 which conforms to and corresponds with the associated opening 17 in the skin 10' of the wing 10 whereby to seat within and form a smooth continuation thereof when the piston head is fully seated within the enlarged end 22 of the casing 18. The inner end of the piston head 25 carries a flange or collar 26' which conforms to and slidingly coacts with the internal surface of the casing 18 during reciprocation of the piston 24.

Centrally secured to the inner end of the piston head 25 is a hollow rod or stem 27. The length of the stem 27 is such that it extends below the shoulder 23 at all times. The transverse dimention or external diameter of the stem 27 is substantially less than that of the main portion of the passage 20 in the casing 18 being approximately equal to the internal diameter of the neck 19 for reciprocation therein. Near its inner end, the stem 27 is formed or otherwise provided with a peripheral flange or collar 28 substantially equal to the internal diameter of the main portion of the passage 20 for sliding coaction therewith. The main portion of the passage 20 is further provided with a peripheral groove 29 adjacent the outer end thereof near the shoulder 23 to receive and accommodate a bearing 30.

The bearing 30 may, for example, be the split-ring type with the outer edge portion adapted to be press-fitted or otherwise secured in the groove 29. The inner diameter of the bearing 30 corresponds to the external diameter of the stem 27 which is adapted to pass therethrough and reciprocate therein. A compression spring 31 is mounted on and around the stem 27 between adjacent faces of the bearing 30 and the flange 28. The stem and attached head 25 of the piston 24 is thereby held in the retracted position, i.e. filling the enlarged space 22 of the passage 20 with the outer surface of its plate 26 forming an uninterrupted continuation of the external surface or skin 10' of the airfoil 10. The opening 17 may be countersunk and the peripheral edge of the plate 26 chamfered or bevelled to facilitate the seating and flush cooperation of the piston head 25 with the opening 17.

The piston head 25 is pierced by an angular passage 32 in alignment or registration with the internal passage of the stem 27 at its inner end when assembled therewith. At its other end, the passage 32 opens at the side of the piston head 25 adjacent the plate 26 to be disposed a distance outwardly of the wing 10 when the piston 24 is protracted. When installed, the side opening of the passage 32 in the piston head 25 is adapted at all times to face substantially aft, i.e. in a direction opposite the direction of flight of the airplane.

In order to maintain the opening 32 in this position, a vertical guide slot 33 is provided in the wall of the casing 18 adjacent the neck 19 thereof. A key fixedly secured to and projecting from the stem 27 of the piston 24 operates in the slot 33. To this end, the flange or collar 28 carried by the stem 27 may be provided with a localized projection 34 which corresponds in length and width to the depth and width of the slot 33. Thus, the piston is thereby maintained at all times against lateral movement relative to the casing 18 and the airfoil 10. The length of the slot 33, of course, corresponds to the reciprocation of the piston 24 in moving to and from its protracted and retracted positions.

From the foregoing, it is apparent that during normal high-speed flight operation of the airplane, the several pistons 24 are disposed in their retracted positions within the airfoil 10 under the normal operation of their respective springs 31. The air flow on and over the skin 10' will supplement the action of each spring 31.

When it is desired to extend the pistons 24 to their operative positions during take-off and landing of the airplane, fluid under pressure is released from its source within the airplane. This fluid then passes through the conduits 15 and 16, stems 27 and acts on and against each wall of the angular openings 32 in the piston heads 25. The pistons 24 are thereby forced outwardly of their casings 18 against the action of their springs 31.

So long as fluid under pressure is available in the conduits 15 and 16, the several pistons 24 will be maintained in their protracted or operative positions. With the pistons 24 so disposed, this fluid is released through the side openings of the passages 32 in the piston heads 25 which act as jet nozzles in directing such fluid aftwardly relative to flight of the airplane. The fluid thereby acts on and against the layers of air passing over and a distance above the skin 10' to force such air including the boundary layer air to adhere to the skin surface. Thus, when the leading and trailing edge sections 12 and 13 are adjusted to a relatively large and substantially symmetrical camber during take-off and landing, separation of the boundary layer air from the upper wing surface is prevented.

The retractable devices including the nozzles 32 associated with the leading edge and trailing edge sections 12 and 13 of the airfoil 10 are identical in every respect one to the other in construction, function and operation. In some applications, however, such nozzle devices associated with the leading edge section 12 may not be desired or required. The principal purpose of the nozzles 32 at and along the forward hinge line of the wing 10 is to prevent a pitching or nosedown moment on the airplane resulting from operation of the nozzles 32 adjacent the rear hinge line.

What is claimed is:

1. The combination with an airplane having a horizontal surface with hinged leading and trailing edge sections, of a conduit for the passage of fluid under pressure mounted within said surface adjacent at least one of said sections, a plurality of individual, angularly disposed nozzle devices mounted within for reciprocation outwardly of said surface adjacent and along each conduit, a spring carried by and operative on each nozzle device to retain it within said surface, and a connection between each nozzle device and the conduit to establish communication between said nozzle device and the interior of said conduit whereby fluid in the conduit acts on and against the several nozzle devices to move them outwardly of the surface against the action of the spring.

2. The combination with an airplane having a wing with a hinged trailing edge section, of a conduit for the passage of fluid under pressure mounted within said wing adjacent said trailing edge section, nozzles defining internal angular passages and mounted within for reciprocation outwardly of said wing at and along said conduit, a plate carried by each of said nozzles disposed in the plane of the outer surface of said wing when said nozzles are located within the wing to thereby form a continuation of the wing surface, and a connection between each nozzle and the conduit locating the angular passage of said nozzle in communication with the interior of the conduit whereby fluid in the conduit passes into the nozzle to move it outwardly of the wing into the airstream.

3. The combination with an airplane having a horizontal surface with hinged leading and trailing edge sections, of at least one conduit for the passage of fluid under pressure fixedly mounted within said surface, nozzles defining angular passages and mounted within for reciprocation outwardly relative to said surface at and along said sections adjacent the hinged edges thereof, said angular passages being operatively connected to one conduit aforesaid whereby fluid in the conduit acts on and against said nozzles to force them outwardly of the surface for the ejection of fluid therethrough over the surface, and compression means disposed between the conduit and nozzles and operative to retain said nozzles within said surface in the absence of fluid in the conduit.

4. The combination with an airplane having a wing with hinged leading and trailing edge sections, of a conduit for the passage of fluid under pressure mounted within said wing, a plurality of spaced openings in said wing on the upper surface thereof adjacent said conduit, a nozzle mounted within each opening for reciprocation outwardly of the wing adjacent the hinged edges thereof, each of said nozzles being operatively connected to said conduit, and carrying a closure conforming in shape and area to the associated opening to thereby fill and close said opening when the nozzle is disposed within the wing, piston means carried by each nozzle operative in response to fluid under pressure acting thereon to force said nozzle outwardly of the wing whereby said fluid is ejected over the wing surface, and compression means mounted between fixed structure of the wing and the nozzles to retain said nozzles in position within the wing when no fluid under pressure is in the conduit.

5. The combination with an airplane having a wing with hinged leading and trailing edge sections, of a conduit for the passage of fluid under pressure mounted within said wing, a plurality of spaced openings in said wing on the upper surface thereof adjacent said conduit, an angular nozzle mounted within each opening for reciprocation outwardly of the wing adjacent the hinged edges thereof, each of said nozzles being operatively connected to said conduit and formed to the transverse shape and area of the associated opening to thereby close said opening when disposed within the wing, piston means carried by each nozzle and operative in response to fluid under pressure acting thereon to force said nozzle outwardly of the wing whereby said fluid is ejected over the wing surface, retaining means operative between each nozzle and fixed structure of the wing to maintain said nozzle in a fixed angular position relative to the wing, and compression means carried by fixed structure of the wing and operative on each nozzle to retain it in position within the wing when no fluid under pressure is acting on the piston means as aforesaid.

6. The combination with an airplane having a horizontal surface with hinged leading and trailing edge sections, of a conduit for the passage of fluid under pressure mounted within said surface, and extensible and retractable nozzles mounted within said surface at and along at least one of said sections adjacent the hinged edge thereof and connected to for communication with the interior of said conduit whereby fluid in the conduit is ejected over the surface when said nozzles are in the extended position.

7. The combination with an airplane having a source of fluid under pressure and a horizontal surface with hinged leading and trailing edge sections, of at least one conduit mounted within said surface for the passage of fluid under pressure from said source, and a plurality of nozzles mounted within for reciprocation outwardly of said surface adjacent and along the hinged edge of said sections and connected to for communication with the interior of each conduit whereby fluid in said conduit is ejected over the surface when said nozzles are in the extended position.

8. The combination with an airplane having a horizontal surface with hinged leading and trailing edge sections, of a conduit fixedly mounted internally of said surface, a plurality of nozzles connected to said conduit and disposed in spaced relation one to the other along the hinged edge of at least one of said sections, each of said nozzles being mounted for reciprocation laterally of the surface to and from positions totally within the surface and projecting outwardly thereof, and compression means disposed between the conduit and each nozzle and operative on said nozzle to retain it in the retracted position within the surface, each nozzle including piston means movable in opposition to said compression means whereby the nozzle may be projected to the position outwardly of the surface.

9. The combination with an airplane having a wing with hinged leading and trailing edge sections, of a conduit for the passage of fluid under pressure mounted within said wing adjacent at least one of said sections, a plurality of individual nozzles each mounted within for reciprocation outwardly of said wing and operatively connected to a conduit aforesaid whereby fluid in said conduit is ejected through the nozzels when said nozzles are disposed outwardly of the wing.

10. In an airplane having a wing with hinged leading and trailing edge sections, the combination with a conduit for the passage of fluid under pressure mounted within said wing, of a tubular casing connected to and projecting laterally from said conduit and in communication with the interior of said conduit at one end and with the atmosphere above the wing adjacent one of said sections at its other end, and a piston mounted for reciprocation in said casing to and from positions totally within the casing and projecting outwardly therefrom into the atmosphere, said piston comprising a hollow stem, a head connected to the outer end of said stem and an angular passage in said head in alignment with the hollow stem and opening at the side of said head.

11. In an airplane having a wing with hinged leading and trailing edge sections, the combination with a conduit for the passage of fluid under pressure mounted within said wing, of a plurality of tubular casings each connected at one of its ends to for communication with the interior of said conduit and at its other end opening into atmosphere at the upper surface of the wing adjacent one of said sections, a piston mounted for reciprocation in each casing to and from positions totally within its casing and projecting outwardly therefrom into the atmosphere, said piston comprising a hollow stem, a head connected to the outer end of said stem and an angular passage in said head in alignment with the hollow stem and opening at the side of the head, the opposed ends of said piston head conforming in shape and area to the transverse shape and area of the casing interior to substantially fill and close it when disposed totally within the casing and the intermediate portion of said piston head being airfoil shape in section, a slot in the wall of the casing, and a projection carried by the piston for constant engagement with said slot to prevent relative lateral movement between the piston and casing.

12. In an airplane having a wing with hinged leading and trailing edge sections, the combination with a conduit for the passage of fluid under pressure mounted within said wing, of a tubular casing connected to and in communication with the interior of said conduit at one end and open to atmosphere at the upper surface of the wing adjacent one of said sections at its other end, a piston mounted for reciprocation in said casing to and from positions totally within the casing and projecting outwardly therefrom into the atmosphere, said piston comprising a hollow stem and a head connected to the outer end of said stem defining a nozzle communicating with the hollow stem and opening substantially parallel to the wing whereby fluid under pressure in the conduit moves the piston to the position where said head projects outwardly of the wing, and a spring operative on said piston to retain it in position totally within the casing when there is no fluid under pressure in the conduit.

13. The combination with an airplane having a wing with hinged leading and trailing edge sections, of a conduit for the passage of fluid under pressure mounted internally of said wing, a plurality of nozzles connected to said conduit and disposed in spaced relation one to the other along the hinged edge of at least one of said sections, each of said nozzles being mounted for reciprocation laterally of the surface to and from positions totally within the surface and projecting outwardly thereof, guide means operative between each nozzle and the wing to control the movement of said nozzle during its reciprocation as aforesaid whereby the nozzle is disposed in the aft direction of the airplane, compression means mounted within the wing and operative between fixed structure therein and each nozzle to retain said nozzle in the retracted position within the surface, and means carried by each nozzle and disposed in the path of the fluid under pressure passing through the conduit and nozzle for the projection of said nozzle outwardly of the wing in opposition to said compression means.

14. The combination with an airplane having a wing with a hinged trailing edge section, of a conduit for the passage of fluid under pressure mounted within said wing, and extensible and retractable nozzles mounted within said wing adjacent and along the hinge aforesaid and connected to for communication with the interior of said conduit whereby fluid in the conduit is ejected over the surface when said nozzles are in the extended position.

15. The combination with an airplane having a wing with a hinged trailing edge section, of a conduit for the passage of fluid under pressure mounted within said wing adjacent and along the hinge line aforesaid, angular nozzles mounted within for extension outwardly of said wing at and along said hinge line and connected to said conduit whereby fluid in the conduit acts on and against said nozzles to extend them outwardly of the wing for the ejection of fluid therethrough over the surface of the wing, said nozzles including biasing means operative to retain them within the wing when no fluid under pressure is in the conduit.

16. The combination with an airplane having a horizontal surface with at least one hinged section, of a conduit for the passage of fluid under pressure mounted within said surface, and at least one extensible and retractable nozzle mounted within said surface adjacent each hinged section and connected to for communication with the interior of said conduit whereby fluid in the conduit is ejected over the surface when each said nozzle is in the extended position.

17. The combination with an airplane having a horizontal surface with at least one hinged section, of a conduit for the passage of fluid under pressure mounted within said surface adjacent at least one of said sections, at least one angular nozzle mounted within for extension outwardly of said surface adjacent each conduit, compression means carried by and operative on each nozzle to retain said nozzle within said surface, and a connection between each nozzle and a conduit to establish communication between said nozzle and the interior of said conduit whereby fluid in the conduit acts on and against each nozzle to extend it against the action of said compression means.

References Cited in the file of this patent
UNITED STATES PATENTS

| | | |
|---|---|---|
| 2,348,252 | Griswold | May 9, 1944 |
| 2,496,565 | Stalker | Feb. 7, 1950 |